United States Patent [19]

Moeglich et al.

[11] Patent Number: 4,983,267
[45] Date of Patent: Jan. 8, 1991

[54] WATER DEIONIZATION AND CONTAMINANTS REMOVAL OR DEGRADATION

[75] Inventors: Karl Moeglich, Dunedin; Dirk Pouli, Clearwater, both of Fla.

[73] Assignee: Innova/Pure Water, Inc., Clearwater, Fla.

[21] Appl. No.: 259,200

[22] Filed: Oct. 18, 1988

[51] Int. Cl.$^5$ .................. B01D 57/02; C25B 1/22
[52] U.S. Cl. ...................... 204/182.4; 204/182.3; 204/149; 204/257; 204/271
[58] Field of Search ............ 204/149, 182.3, 182.4, 204/149, 151, 152, 271, 270, 257; 210/748

[56] References Cited

U.S. PATENT DOCUMENTS

| | | | |
|---|---|---|---|
| 3,728,238 | 4/1973 | Tarjanyi et al. | 204/149 |
| 3,869,376 | 3/1975 | Tejeda | 204/182.4 |
| 3,884,722 | 5/1975 | Tucholski | 429/190 |
| 3,915,822 | 10/1975 | Veltman | 204/149 |
| 3,928,165 | 12/1975 | Piester | 204/270 |
| 4,004,994 | 1/1977 | Andrus | 204/149 |
| 4,107,021 | 8/1978 | Okazaki | 204/271 |
| 4,326,935 | 3/1982 | Moeglich | 204/182.3 |
| 4,481,096 | 11/1984 | Okazaki | 204/271 |
| 4,594,135 | 1/1986 | Goldstein | 204/182.3 |

Primary Examiner—John F. Niebling
Assistant Examiner—Arun S. Phasge
Attorney, Agent, or Firm—Nixon & Vanderhye

[57] ABSTRACT

A method and device provide for the deionization and contaminants removal or degradation of aqueous liquids, particularly drinking water. The water is caused to flow in a first direction and while flowing it is treated so as to simultaneously effect deionization via electromigration and degradation or removal of the contaminants therein on particle surfaces. The water flows upwardly through a bed formed by a mixture of conductive and non-conductive particles, such as sand and graphite particles, with the particles of the bed being separated from an anode (mounted on one side of the bed) by an anionic membrane, and a cathode (mounted on the other side of the bed) by a non-ionic porous membrane. According to the invention the following ions and contaminants can be destroyed, or removed from, the water: calcium, magnesium, and other water hardening ions; sodium, iron, bacteria; chlorine, phenol, odor and color contaminants; and pesticides.

20 Claims, 2 Drawing Sheets

WATER DEIONIZATION AND CONTAMINANTS REMOVAL OR DEGRADATION

BACKGROUND AND SUMMARY OF THE INVENTION

The invention relates to a method and apparatus for treating aqueous liquids, particularly drinking water, for effecting deionization removal of contaminants. There have been numerous laboratory and commercial attempts in the past to produce safe and acceptable drinking water irrespective of the feed water source. These attempts include devices utilizing activated charcoal, distillation, ozone generators, reverse osmosis units, and ion exchange resins. While all of these devices are acceptable to a certain extent, none of them are capable of accomplishing the objective according to the invention.

Activated charcoal has demonstrated effectiveness in removing some organics, color, odor, and taste from drinking water. However, activated charcoal adsorbs rather than destroys the contaminants. Therefore, it has a limited life and must frequently be replaced. When not properly replaced it can serve as a breeding ground for bacteria and therefore contaminates the water it seeks to purify. It has been proposed to utilize silver with the activated charcoal to provide disinfecting power, however in practice silver is easily deactivated by colloidally suspended materials.

Distillation devices effectively reduce the ionic content of the water, but so much so that the water is usually tasteless. Also many volatile organic species are carried over in the distillation process and retained in the drinking water, and distillation is a cumbersome, energy intensive procedure which requires frequent cleaning of the distillation vessel.

Ozone generators are capable of oxidizing organic contaminants, and microorganisms, in water, but do not effect deionization. Also the generator to produce the ozone is a high voltage one.

Reverse osmosis units can effect deionization and thereby reduce the level of inorganics. However the waste stream with such units is relatively large, the water must be extensively pre-filtered before it reaches the units, and even with pre-filtration fouling from organics, bacteria, and other species often occurs. Such units also have a limited life and require significant cleaning and maintenance.

Ion exchange resins can effectively deharden water, but they do so by substituting other ions—usually sodium ions—which may be undesirable for health reasons. Also the resins act by removing, rather than destroying, materials so they must be replaced when their capacity has been reached; and they do not reduce the levels of organic contaminants or microorganisms.

According to the present invention it is possible to simultaneously deionize aqueous liquid, and remove the contaminants therein. According to the invention the deionization is accomplished via electromigration, while the degradation is accomplished on the surface of particles within the units. In the preferred embodiment, the device according to the invention comprises a bed containing particles—preferably a mixture of non-conductive particles and conductive particles such as sand and graphite particles. An anode is mounted on one side of the bed and a cathode on the other, and preferably, though not necessarily, the electrodes are separated from the bed by porous material, such as non-ionic, porous membranes. A voltage gradient is provided across the bed by the electrodes, and the liquid to be purified is caused to flow through the bed (preferably upwardly). Deionization occurs since the ions within the liquid (irrespective of their charge, or the balance of their charges) are attracted to the electrodes. Degradation of contaminants takes place at the surfaces of the particles.

A wide range of sizes of particles, and proportions of non-conductive to conductive particles, may be utilized within the scope of the invention. Typically the non-conductive particles will be sand (although a wide variety of other materials may be utilized), the sand particles having a size range between about 0.01–0.16 inches. The conductive particles preferably comprise graphite particles, which typically have a size range of about 0.3 mm–0.85 mm. The mixture of particles can range from 100% conductive particles to 100% non conductive particles. For most applications there will be between about 5–20%, by volume, of conductive particles, with about 7.5% conductive particles considered optimum.

In one particularly advantageous form of the invention, a countertop water purifier is provided which has a single housing mounting all of the components, with a feed reservoir at the top of the housing, and provision for receipt of a removable container under a spigot which discharges purified water from the unit.

It is the primary object of the present invention to effectively destroy or remove a wide variety of ions and organic contaminants from aqueous liquids, particularly drinking water, in a simple, workable, and cost-effective manner. This and other objects of the invention will become clear from an inspection of the detailed description of the invention, and from the appended claims.

DETAILED DESCRIPTION OF THE DRAWINGS

Figure 1:
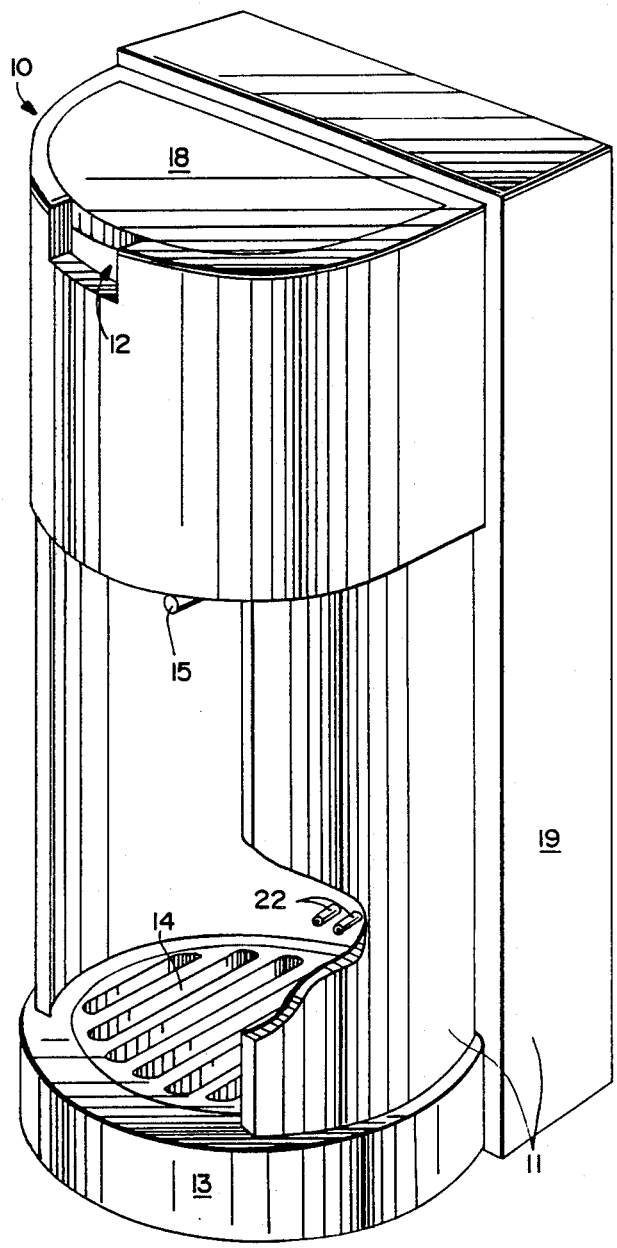
FIG. 1 is a top perspective view of an exemplary countertop water purification device according to the invention.
Figure 2:
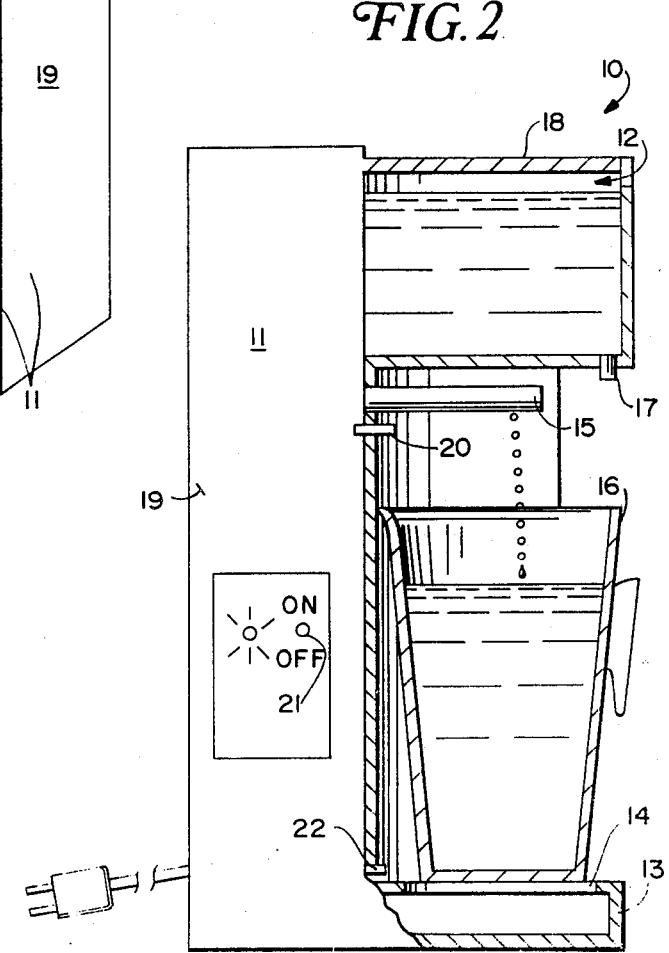
FIG. 2 is a side view, partly in cross-section, and partly in elevation, of the device of FIG. 1.

One form of an exemplary water purification apparatus according to the present invention is shown generally by reference numeral 10 in FIGS. 1 and 2. The device 10 comprises a single exterior casing 11 which contains all of the operative components, including a reservoir 12 disposed at the top of the unit, and a drain tray 13 with a slotted drain cover 14 on the top surface thereof. A spigot 15 is mounted above the slotted drain cover 14, and below the reservoir 12, and is for discharging purified aqueous liquid into a removable container 16 which is supported by the drain tray 13 beneath the spigot 15 (see FIG. 2). A drain 17 for the reservoir 12 is mounted at the bottom of the reservoir 12, and above the slotted drain cover 14, and a removable cover 18 preferably closes off the top of the reservoir 12.

Mounted within the section 19 of the housing 11 are the operative water purification components. An on/off flow control valve associated with the components is controlled by an actuator 20 from the exterior of the unit 10, and the power supply within the unit is controlled by an on/off switch 21 (see FIG. 2) also accessible from the exterior of the unit. Waste compartment drain valves discharge into pipes 22 at the bottom of the housing portion 19, just above the slotted drain cover 14.

Figure 3:
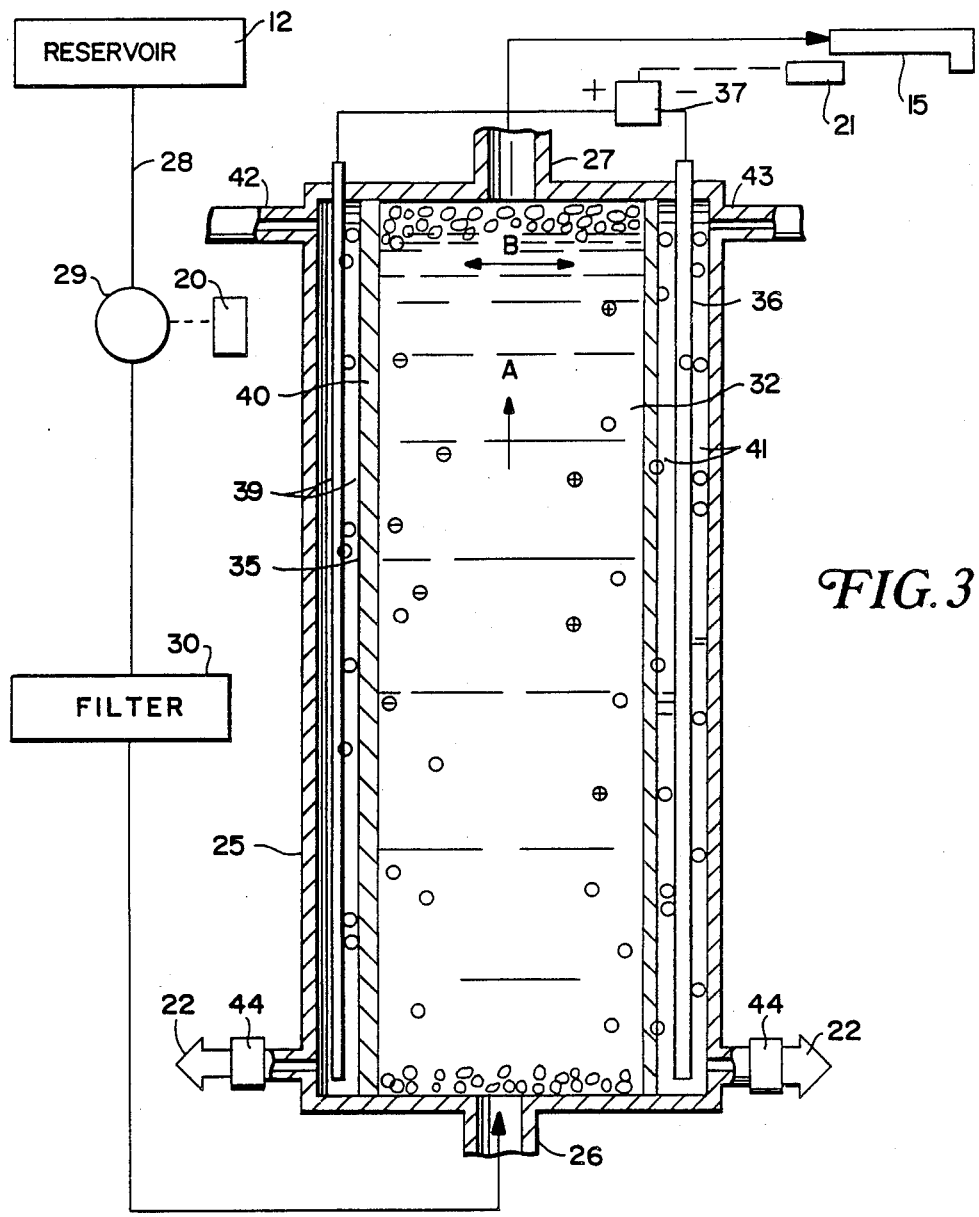
FIG. 3 is a schematic side cross-sectional view showing the operative purification components of the device of FIGS. 1 and 2.

Exemplary operative components of the device 10 are illustrated in FIG. 3. The operative components are preferably contained within a housing e.g. plastic) 25, which contains a contaminated liquid inlet 26, and a purified liquid outlet 27. A conduit 28 extends from the reservoir 12 to the inlet 26, and preferablY a flow control valve 29 (controlled by actuator 20) is disposed in conduit 28. The valve 29, and actuator 20, preferably are of the type that allow adjustment of the flow rate in the conduit 28 to any value between a fully "closed" position and a fully "open" position. If desired, a filter 30 may be disposed in the conduit 28 for filtering out any large particulate contaminants.

Disposed within the housing 25 is a bed—shown generally by reference numeral 32—of particles. The particles may comprise all non-conductive particles, all conductive particles, or—preferably —a mixture of non-conductive and conductive particles. One function of the particles is to provide surface area on which contaminant degradation occurs Such processes occur most readily on the conductive particle surfaces. The particles do not perform a filtration function.

While a wide variety of non-conductive particles may be utilized, the preferred particles comprise sand. The preferred size range for the sand particles is between about 0.01 inches–0 16 inches. A wide variety of conductive particles can also be utilized. The preferred conductive particles are graphite particles, with a size range of between about 0.3 mm–0.85 mm. For most desired purposes a mixture of non-conductive and conductive particles is provided, the conductive particles being between about 5–20% by volume. About 7.5%, by volume, of graphite particles intermixed with sand particles is optimal for drinking water purification purposes.

The aqueous liquid to be treated is caused to flow through the bed 32 in a first direction A. Preferably the direction A is upward in order to avoid bed compaction and to drive out any gases that may be formed. However for some applications the direction A may be downward, horizontal, or at varying degrees therebetween. For the embodiment illustrated in FIG. 3, it will be seen that the reservoir 12 provides sufficient head to cause the water to flow through the bed 32 upwardly in direction A, and to be discharged from the spigot 15.

Electrodes 35, 36 are disposed with the casing 25 to provide a voltage gradient to effect electromigration and enhanced degradation. Preferably the electrode 35 comprises an anode, and the electrode 36 comprises a cathode. The anode may be of any conventional material such as platinum plated on titanium, or platinum clad niobium. The cathode 36 may also be of any suitable conventional material, such as stainless steel. The electrodes 35, 36 are connected up to an appropriate source of emf 37. The source 37 is a DC source. In a preferred embodiment, the source 37 is a power rectifier which converts normal AC line voltage accessed by a conventional cord and plug 38—see FIG. 2—to DC.

The electrodes and emf source 35-37 thus provide a voltage gradient across the bed 32 in a second dimension B, which is generally perpendicular to the direction A.

While a commonly used power range for a DC source is about 40-100 volts, the mechanisms of the invention are operable with a minimum voltage determined by the voltage used by the electrodes themselves (e.g. 2 volts), and the maximum is determined by the heat generated in the device.

While the electrodes 35, 36 may be disposed directly in the bed 32, preferably they are disposed in a liquid filled compartment separated from the bed 32 in order to facilitate removal of contaminants, and thus to extend the life of the unit. As illustrated in FIG. 3 the anode 35 is disposed in an anode compartment 39 separated from the bed 32 by the membrane 40, and the cathode compartment 41 is separated from the bed 32 by a similar membrane 40. The membranes 40 may be of any suitable porous material. As one example, the membranes 40 may be comprised of polypropylene felt material, e.g. having a water permeability of 448 ml per square inch per hour at one inch water pressure differential.

The anode chamber 39 contains a contaminated anolyte discharge outlet 42 at the top thereof, and the cathode chamber 41 includes a contaminated catholyte discharge outlet 43 at the top thereof. The outlets 42, 43 ultimately discharge to drain tray 13. Further, at the bottom of the chambers 39, 41 are provided the discharge outlets 22, which may include manually operated valves 44 disposed therein.

The utilization of the device illustrated in FIGS. 1 through 3 will now be described with respect to several operative examples. For Examples 1-3, 5, and 6, the parameters of the bed 32 are as follows:

| | |
|---|---|
| Height | 15 in. (38 cm) |
| Width | 1.5 in. (3.8 cm) |
| Depth | 4.5 in. (11.4 cm) |
| Volume | 100 cu. in. (1600 ml) |
| Sand Size | 6–20 mesh (0.85–4.0 mm) |
| Graphite Size | 20–50 mesh (0.30–0.85 mm) |
| Graphite Percentage | 7½% by volume |

EXAMPLE 1

Tap water from Clearwater, Fla. was fed to the device 10, and the flow rate was controlled to varying values, and the hardness and resistivity of the outflow measured. The emf source was 75 volts DC, and the pH of the outflow water was 6. The following results were obtained:

| | Flow Rate (ml/min) | Hardness (ppm as $CaCO_3$) | Resistivity (KΩ-cm) |
|---|---|---|---|
| Feed Water | — | 240 | 2.1 |
| Outflow Water | 16 | 17 | 23 |
| | 30 | 51 | 6.9 |
| | 47 | 68 | 5.0 |
| | 64 | 102 | 3.4 |

EXAMPLE 2

1.1 ml of bleach was placed in five gallons of Clearwater, Fla. tap water and neutralized utilizing sulfuric acid, to produce a solution having about 6 ppm free chlorine. The bed 32 was saturated first without power so that free chlorine was observed in the outflow. Upon application of power to the unit the level of free chlorine in the outflow became non-detectable (less than 0.1 ppm) in each of the following two runs:

| | |
|---|---|
| Voltage | 75V DC |
| Current | 0.26 amps |
| Outflow | pH 6 |
| Feed | 6.0 ppm free $Cl_2$ |

RUN 1

Flow Rate: 63 ml/min
Outflow (ppm free $Cl_2$)
Without power 4.8
After 10 min. with power 0

RUN 2

Flow Rate: 64 ml/min
Outflow (ppm free $Cl_2$)
Without power 3.8
After 30 min. with power 0

EXAMPLE 3

The following test was run utilizing the standard sand and graphite bed described earlier:

| Operating Conditions | |
|---|---|
| Current | 0.2–0.3 amps |
| Voltage | 75 VDC |
| Average Flow Rate | 5 gal/day |
| Saturated without Power | 5 days |
| Test with power | 9 days |
| Input Feed Water: Includes pond water bacteria | |
| Average Bacteria Level (counts/ml) | 80,000 |
| Hardness (ppm as $CaCO_3$) | 240 |
| Resistivity (KΩ-cm) | 1.8 |
| pH | 7 |

Input Feed Water: Includes pond water bacteria.

| | Output Water | |
|---|---|---|
| | Bacteria (counts/ml) | Hardness (PPM AS $CACO_3$) |
| without power | 50,000 to >500,000 | 240 |
| Power On: | | |
| 1 hour | 12,000 | 50 |
| 2 hours | 100 | 45 |
| 18 hours | 10 | <20 |
| 3 days | 0 | <20 |
| 7 days | 0 | <20 |
| 9 days | 0 | <20 |

EXAMPLE 4

The parameters in this test were similar to those for Example 3 except that the bed 32 consisted of only sand (no conductive particles). The operating conditions, and results achieved, are as follows:

| Operating Conditions: | |
|---|---|
| Current | 0.2–0.3 amps |
| Voltage | 75 VDC |
| Average Flow Rate | 5 gal/day |
| Saturation without power | 3 days |
| Test with Power | 6 days |
| Input Feed Water: Includes pond water bacteria: | |
| Average Bacteria Level (counts/ml) | 80,000 |
| Hardness (ppm as $CaCO_3$) | 200 |
| Resistivity (KΩ-cm) | 2.1 |
| pH | 7 |

| | Output Water | |
|---|---|---|
| | Bacteria (counts/ml) | Hardness (ppm as $CaCO_3$) |
| without power | 55,000 | 200 |
| Power On: | | |
| 1 hour | 20,000 | 50 |
| 2 hours | 5,000 | 35 |
| 18 hours | 1,300 | <20 |
| 3 days | 1 | <20 |
| 7 days | 0 | <20 |
| 9 days | 10 | 35 |

EXAMPLE 5

This example was run to test coliform bacteria devitalization in phosphate solution (no chloride present). The operating parameter and results of this example are as follows:

| Operating Conditions | |
|---|---|
| Current | 0.10–0.15 amp. |
| Voltage | 50 VDC |
| Average Flow Rate | 5 gal/day |
| Saturation without Power | 5 days |
| Test with Power | 2 days |
| Input Feed Water | |
| Composition: | 86 ppm $NaH_2PO_4$ in deionized water 64 ppm $Na_2HPO_4$ |
| Average Bacteria Level (counts/ml) | 90,000 |
| Resistivity | 5.4 |
| pH | 7 |

| | Output Water |
|---|---|
| | Bacteria (counts/ml) |
| without power | 200,000 |
| Power On: | |
| 1 hour | 50,000 |
| 2 hours | 180 |
| 18 hours | 20 |
| 25 hours | 10 |
| 26 hours | 1 |
| 48 hours | 340 |

When a similar test was done at 75 volts DC, and a current of 0.4 amperes, the unit overheated.

EXAMPLE 6

The feed solution concentration and voltage for this example were the same as for Example 5. The example was run at 24 gallons per day feed rate during the day, and 5 gallons per day rate at night. The results are as follows:

| Time (hours) | Flow Rate (gal/day) | Current (amps) | Bacteria Level (Counts/ml) |
| --- | --- | --- | --- |
| 0 | 5 | 0.13 | 3,000 |
| 1 | 24 | unit dumped/rinsed | — |
| 3.5 | 24 | 0.09 | 5,300 |
| 6 | 24 | 0.06 | 5,300 |
|  | 5 | united dumped/rinsed | — |
| 24 | 5 | 0.13 | 3,400 |
|  | 24 | flow rate increased | — |
| 27 | 24 | 0.13 | 11,000 |
| 30 | 24 | 0.14 | 7,100 |

EXAMPLE 7

In this example the size of the bed 32 is different than previously indicated. Two series-connected beds were utilized, each bed being 7½ inches high, having a width of 1¼ inches, and a depth of 2 inches. The sand and graphite particles, and mixture, were substantially the same as previously indicated. The power was 100 volts, 0.15 amperes. Pond water was used as the feed water, with the following results:

| Performance | IN | OUT |
| --- | --- | --- |
| Total Bacteria Count | >50,000 | 1,200 |
| Hardness (as $CaCO_3$) | 170 ppm | 34 ppm |
| pH | 6 | 7 |

EXAMPLE 8

In this example the bed parameters were the same as for Example 7, the power was 100 volts, 0.3 amperes, and the outflow rate was 4 gallons per day. Contaminated water was used as the feed water with the following results:

| Performance | IN | OUT |
| --- | --- | --- |
| Total Bacteria Counter | >200,000 | 950 |

EXAMPLE 9

In this example the bed and power conditions were the same as for Example 8, and the outflow rate was 3 gallons per day. Aqueous liquid contaminated with methylene blue dye was the feed liquid, and the results were as follows:

| Performance | IN | OUT |
| --- | --- | --- |
| Methylene Blue (ppm) | 10 | <0.1 |
| pH | 7 | 6.5 |

EXAMPLE 10

In this example the bed configuration was the same as for Example 7, the power as 100 volts, 0.01 amperes, and the flow rate was 3 gallons per day. The feed aqueous liquid was contaminated with pesticide. The following results were achieved:

| Performance | IN | OUT | Allowable Limits |
| --- | --- | --- | --- |
| Endrin (ppb) | 11.0 | 0.0 | 4.0 |
| Aldrin (ppb) | 3.9 | 0.0 | (none set) |
| Lindane (ppb) | 9.0 | 0.18 | 4.0 |
| Methoxychlor (ppb) | 136. | 0.0 | 100 |

EXAMPLE 11

For this example, a single bed 32 was used, having a height of 14 inches, a width of 2⅛ inches, and a depth of 2 inches. In this bed sand composed 85% by volume, and graphite 15% by volume. The power was 90 volts, 0.03 amperes, and the flow rate was 4 gallons per day. The feed water was contaminated with organics. The results were:

| Performance | IN | OUT |
| --- | --- | --- |
| phenol (ppm) | 100 | 5 |

As the above examples make clear, by practicing the method according to the present invention it is possible to remove sodium, calcium, magnesium, iron, and other ions to destroy bacteria, pesticides, and organics, and to remove chlorine and odor and color contaminants. This may be accomplished with a power consumption typically less than 0.1 kwh/gallon.

In a typical use of the device illustrated in FIGS. 1 through 3, the cover 18 of the reservoir 12 is removed and approximately 1 gallon of tap water is poured into reservoir 12, with the drain 17 plugged. The actuator 20 is actuated to achieve a desired flow rate of water through the conduit 28 to the bed 32. There is a delay of a few minutes before water flows out the spigot 15. Once some water flows out of the spigot 15, the switch 21 is actuated, turning on the power. Negative ions contained in the aqueous liquid passing in direction A through the bed 32 pass through the membrane 40 into the anode chamber 39, while positive ions pass through membrane 40 into cathode chamber 41. Organics, bacteria, and the like are degraded and devitalized, respectively within the bed 32, with the result that the water discharged from the spigot 15 is purified. The water is collected in pitcher 16 and once the water stops trickling out of spigot 15 the actuators 20 21 moved to are the off position.

After treatment of every 3 to 5 gallons of water, the valves 44 are actuated to allow the anode and cathode compartments 39, 41 to drain completely. This is accomplished by turning the power off, turning the actuator 20 to the off position, making sure that the drain tray 13 is pushed all the way into he base, opening the drain valve 44 to effect draining of liquid therefrom through the slotted drain cover 14, and then closing all of the valves 44, etc. Then water may again be poured into the reservoir 12; a delay of at least 30 minutes before moving actuator 21 to the on position again is desirable to insure proper treatment.

Periodically the reservoir 12 will also be drained through the drain 17, discharging into the drain tray 13, and the contents of the drain try 13 are periodically disposed of.

Figure 4:
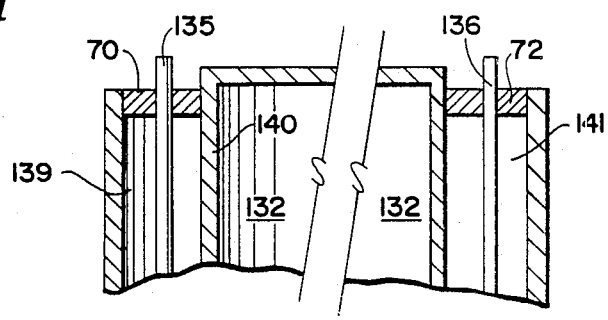
FIG. 4 is a schematic side cross-sectional view of the operative components of another exemplary water purification device according to the present invention.

FIG. 4 illustrates, schematically, portions of another embodiment of an exemplary device according to the invention, the device in FIG. 4 using the same reference numerals as the device of FIG. 3 only preceded by a "1" for comparable structures.

In the device illustrated in FIG. 4, between the anode compartment 139 and the bed 132 is provided a membrane 140 which comprises an anion exchange membrane. The anion exchange membrane facilitates flow control through the cell since the anolyte has no hydraulic communication with the rest of the system. Additionally, without the anionic membrane when feed water with high dissolve solids content was fed to the unit the product water obtained a low pH (e.g. 314 4), and such a low pH product water also was noted when the anolyte waste stream was low (that is the product water/anolyte waste flow exceeded about 10). The provision of the anion exchange membrane between the bed 132 and the anode 135 eliminates this difficulty.

Also, according to the invention it is desirable to provide gas permeable membranes 70, 72, respectively (see FIG. 4) above the anode chamber 139 and cathode chamber 141. The gas permeable membranes permit the evolved hydrogen and oxygen to escape to atmosphere while retaining the liquid content within the anolyte and catholyte chambers It will thus be seen that according to the present invention a method and an apparatus have been provided for effectively deionizing water, and/or effectively oxidizing the contaminants in water, to produce substantially pure water for drinking irrespective of the aqueous feed liquid. While the invention has been herein shown an described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent devices and methods.

What is claimed is:

1. A method of treating an aqueous liquid having ions and contaminants therein, comprising the step of:
   simultaneously dionizing, by electromigration, the liquid and removing and degrading, on particle surfaces, the contaminants therein.

2. A method as recited in claim 1 wherein said step is accomplished by flowing the liquid in a first direction through a bed containing a major portion, by volume, of non-conductive particles, and a minor portion, by volume, of conductive particles intermixed with the non-conductive particles; and applying a voltage gradient to the bed in a second direction, generally perpendicular to the first direction.

3. A method as recited in claim 2 wherein the non-conductive particles comprise sand particles having sizes ranging from about 0.01 inches–0.16 inches, and wherein the conductive particles comprise graphite particles having a size range of about 0.30–0.85 mm, and wherein said graphite particles comprise between approximately 5–20%, by volume, of the bed.

4. A method as recited in claim 2 wherein said first direction is generally upward.

5. A method as recited in claim 2 wherein said voltage applying step is accomplished by utilizing an anode and a cathode, and separating the anode from the bed by an anion exchange membrane, and separating the cathode from the bed by a non-ionic, porous membrane, to provide liquid-filled anode and cathode chambers.

6. A method as recited in claim 5 comprising the further step of providing gas permeable membranes at the tops; of the anode and cathode chambers.

7. A method of treating an aqueous liquid comprising the steps of:

(a) flowing the liquid in a first direction through a bed containing a major component, by volume, of non-conductive particles mixed with a minor component, by volume, of conductive particles; and (b) applying a voltage gradient across the bed in a second direction, generally perpendicular to said first direction.

8. A method as recited in claim 7 wherein
steps (a) and (b) are practiced to effectively remove, or destroy, magnesium, calcium, and other water hardening ions, sodium, iron, chlorine, bacteria, phenol, methylene blue, pesticides, and other unhealthly contaminants, in the aqueous liquid.

9. A method as recited in claim 7 wherein the conductive particles are graphite particles, and wherein the non-conductive particles are sand particles, and wherein said first direction is generally upward.

10. A method as recited in claim 9 wherein said voltage applying step is accomplished by utilizing an anode and a cathode, and separating the anode from the bed by an anionic membrane, and separating the cathode from the bed by a non-ionic, porous membrane, to provide liquid-filled anode and cathode chambers.

11. A method as recited in claim 10 comprising the further step of providing gas permeable membranes at the tops of the anode and cathode chambers.

12. A method as recited in claim 7 wherein step (a) is practiced by providing between approximately 5–20%, by volume, conductive particles in the bed.

13. A method as recited in claim 7 wherein step (a) is practiced by providing sand non-conductive particles having sizes ranging from about 0.01 inches–0.16 inches, and by providing graphite conductive particles having a size range of about 0.30–0.35 millimeter.

14. A liquid treatment device comprising:
   a bed of particulate material comprising a mixture of conductive particles and non-conductive particles;
   an anode operatively associated with said bed, and prevented from contacting said bed by a membrane;
   a cathode, spaced from said anode, and also operatively associated with said bed, and prevented from contacting said bed by a membrane;
   a source of emf operatively connected to said anode and said cathode; and
   means for introducing liquid into, and removing liquid from, said bed.

15. A device as recited in claim 14 wherein said non-conductive particles comprise sand particles having a size range of about 0.01 inches–0.16 inches, and wherein said conductive particles comprise graphite particles having a size range of about 0.3 mm–0.85 mm. and wherein said graphite particles comprise approximately 5–20%, by volume, of the particles in said bed.

16. A device as recited in claim 14 wherein all of the components of the device are contained in a single housing, and wherein said means for introducing liquid into said bed comprises a reservoir at the top of said housing, a conduit extending from said reservoir to the bottom of said bed, and a spigot extending outwardly from said housing at the top of said bed, said reservoir being above said spigot.

17. A device as recited in claim 16 further comprising a drain for said reservoir; a tray defining the bottom of said housing and having a slotted drain cover therein, said slotted drain cover being locate vertically below said reservoir drain; and said drain tray and said housing comprising means for receiving a removable container to be supported by said drain cover while disposed beneath said spigot.

18. A liquid treatment device comprising:
a bed of particulate material;
an anionic, first, membrane disposed on a first side of said bed, and a second, non-ionic porous, membrane disposed on a second side of said bed, said first membrane defining a first electrode chamber, and said second membrane defining a second electrode chamber;
a first electrode disposed in said first electrode chamber;
a second electrode disposed in said second electrode chamber, and adapted to be operatively connected with said first electrode to a source of emf; and
means for introducing liquid into and removing liquid from said bed.

19. A device as recited in claim 18 wherein all of the components of the device are contained in a single housing, and wherein said means for introducing liquid into said bed comprises a reservoir at the top of said housing, a conduit extending from said reservoir to the bottom of said bed, and a spigot extending outwardly from said housing at the top of said bed, said reservoir being above said spigot; a drain for said reservoir; a tray defining the bottom of said housing and having a slotted drain cover therein, said slotted drain cover being located vertically below said reservoir drain; and said drain tray and said housing comprising means for receiving a removable container to be supported by said drain cover while disposed beneath said spigot.

20. A device as recited in claim 18 further comprising gas permeable membranes disposed at the tops of said first and second electrode chambers.

* * * * *